J. D. FELTEN.
TYMPAN SHEET.
APPLICATION FILED JUNE 7, 1915.
1,205,879.
Patented Nov. 21, 1916.
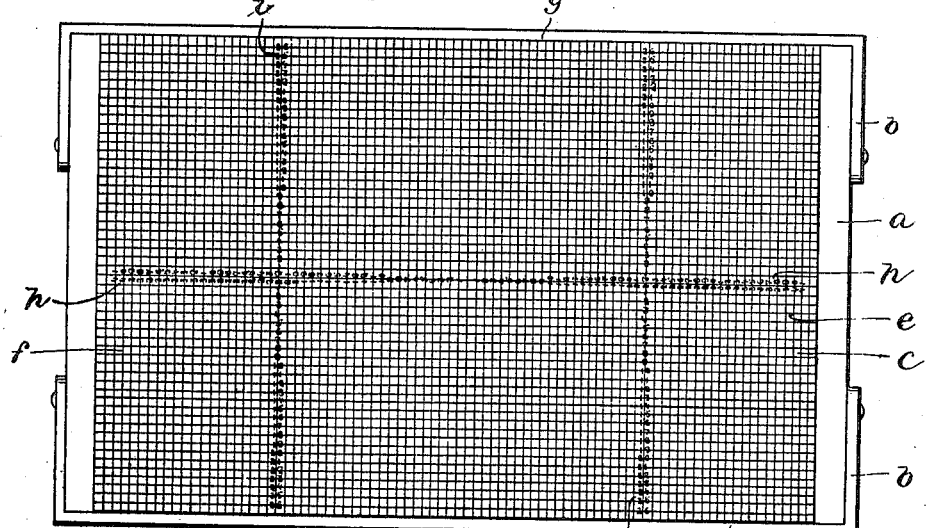
Fig. 1.
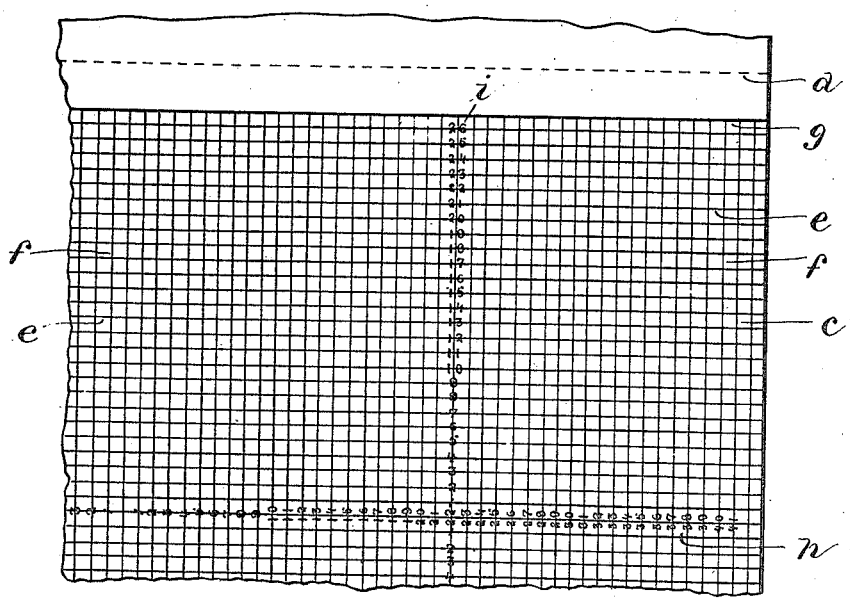
Fig. 2.
Fig. 3.
Witness
E. R. Ruppert
Inventor
J. D. Felten
By Victor J. Evans
Attorney

UNITED STATES PATENT OFFICE.

JOHN D. FELTEN, OF MARENGO, ILLINOIS.

TYMPAN-SHEET.

1,205,879.   Specification of Letters Patent.   Patented Nov. 21, 1916.

Application filed June 7, 1915. Serial No. 32,622.

*To all whom it may concern:*

Be it known that I, JOHN D. FELTEN, a citizen of the United States, residing at Marengo, in the county of McHenry and State of Illinois, have invented new and useful Improvements in Tympan-Sheets, of which the following is a specification.

This invention is an improved tympan sheet for use on the platen of a bed-and-platen printing press and to serve as a gage to facilitate the adjustment and placing of gage pins, quads or the like on the tympan sheet and for color printing and other work which requires exact registry adjustment, one object of the invention being to provide an improved tympan which has consecutive division and gage lines at right angles to one another and parallel with the edges of the sheet, to enable the gage pins or quads to be attached exactly into required positions on tympan sheet, a further object being to provide an improved tympan sheet in which the division and gage lines form units of measurement on the point system.

The invention consists of a tympan sheet having consecutively arranged division and numbered gage lines at right angles to one another, parallel with the edges of the sheet, and forming units of measurement on the point system, as hereinafter described and claimed.

In the accompanying drawings:—Figure 1 is a plan of a tympan sheet provided with consecutively arranged division and numbered gage lines in accordance with my invention, and showing the tympan sheet in place on the platen and bed-and-platen printing press. Fig. 2 is a similar view of the tympan sheet on a larger scale. Fig. 3 is a detail sectional view of the same, showing the tympan sheet doubled.

For the purposes of this specification the platen of a bed-and-platen printing press is here shown at *a* provided at its upper and lower sides with the usual clamps *b* for securing the tympan sheet. The tympan sheet *c* may be either single or may be doubled as here shown, by folding it on a central line *d*. The sheet may be made of any suitable paper, of any desired thickness, texture or finish.

In accordance with my invention I provide the tympan sheet with ruled lines *e f* which constitute division lines and are respectively parallel with the sides and ends of the platen, the vertical lines *f* being at right angles to the horizontal, longitudinally ruled lines *e*. That portion of the tympan sheet which is thus ruled or provided with division lines extends from the lower edge to the upper edge of the platen and from end to end thereof, or substantially so. At the upper and lower edges of the line portion of the tympan sheet are longitudinal lines *g* which are heavier than the division lines and which, when the tympan sheet is clamped on the platen, are at the upper and lower edges of the platen and exactly parallel therewith, so that the division lines are parallel with the sides of the platen. The division lines form units of measurement between them and are spaced or located on the point system, the units of measurement being preferably picas or twelve points.

The vertical division lines are associated with numbered gage lines which are numbered consecutively from one up, as at *h*, beginning at points one space removed from opposite sides of the center of the exposed portion of the sheet, and the longitudinal horizontal division lines are correspondingly associated with similar gage lines which are consecutively numbered by columns *i*, spaced, a suitable distance from the ends of the sheet and beginning one space removed from the vertical center of the sheet as shown.

By thus providing the tympan sheet with the consecutively arranged division and numbered gage lines at right angles to one another and parallel with the edges of the sheet and platen, after an impression has been printed on the sheet, the gage pins or quads can be readily secured at the exact points required to obtain perfect registry of the work, as will be understood.

Having thus described my invention I claim;—

A tympan sheet provided with horizontal and transverse division lines arranged at right angles to each other and in spaced relation to form units of measurement on the point system, and longitudinal and transverse gage lines arranged at right angles to each other and parallel with the longitudinal and transverse edges of the sheet, said longitudinal gage line extending centrally of the sheet, and said transverse gage lines being arranged between the transverse center of the sheet and the opposite transverse edges thereof, each of said gage lines having gage scale indications consisting of two sets of numerals of like character designating similar units of measurement and beginning with the numerals of least value at the center of each line and thence extending progressively in increasing values toward the ends of the line, said longitudinal and transverse gage lines having similar numerals registering therewith at their points of intersection.

In testimony whereof I affix my signature in presence of two witnesses.

JOHN D. FELTEN.